(12) United States Patent
Danzy

(10) Patent No.: US 9,677,679 B2
(45) Date of Patent: Jun. 13, 2017

(54) VALVE WITH FORCE GENERATING ELEMENT

(71) Applicant: Dresser Inc., Addison, TX (US)

(72) Inventor: Roger Dale Danzy, Pineville, LA (US)

(73) Assignee: Dresser, Inc., Addison, TX (US)

( * ) Notice: Subject to any disclaimer, the term of this patent is extended or adjusted under 35 U.S.C. 154(b) by 270 days.

(21) Appl. No.: 13/928,096

(22) Filed: Jun. 26, 2013

(65) Prior Publication Data
US 2015/0001431 A1 Jan. 1, 2015

(51) Int. Cl.
*F16K 25/00* (2006.01)
*F16K 31/122* (2006.01)

(52) U.S. Cl.
CPC .......... *F16K 25/00* (2013.01); *F16K 31/1223* (2013.01); *F16K 31/1221* (2013.01); *Y10T 137/86815* (2015.04)

(58) Field of Classification Search
CPC .. F16K 25/00; F16K 31/1221; F16K 31/1223; Y10T 137/86815
USPC ................ 251/186, 324; 137/625.4
See application file for complete search history.

(56) References Cited

U.S. PATENT DOCUMENTS

| | | | |
|---|---|---|---|
| 1,500,674 A | | 7/1924 | Darling |
| 1,552,710 A | | 9/1925 | Knudsen |
| 2,956,578 A | * | 10/1960 | Noon et al. ............ 137/115.17 |
| 3,001,545 A | * | 9/1961 | Ziege ................ F16K 17/0433 137/478 |
| 3,211,418 A | * | 10/1965 | Klinger-Lohr ................ 251/176 |
| 3,211,419 A | * | 10/1965 | Klinger-Lohr ................ 251/186 |
| 4,481,974 A | * | 11/1984 | Schmitt ................ F16K 17/0433 137/514 |
| 4,672,203 A | * | 6/1987 | Holkeboer ............ F16K 39/024 137/630.15 |
| 6,318,702 B1 | * | 11/2001 | Hettel .................. F16K 31/0689 251/64 |
| 6,413,665 B1 | * | 7/2002 | Blanchet et al. ............. 429/470 |
| 6,491,056 B2 | * | 12/2002 | Gibb ...................... A62C 37/50 137/271 |
| 6,527,010 B1 | * | 3/2003 | Watson ..................... 137/625.63 |
| 7,810,521 B2 | * | 10/2010 | Gloor et al. .................. 137/636 |
| 2003/0020035 A1 | * | 1/2003 | Kremer .......................... 251/89 |
| 2003/0094590 A1 | | 5/2003 | Palmer |

(Continued)

FOREIGN PATENT DOCUMENTS

DE 1500133 A1 5/1969

OTHER PUBLICATIONS

International Search Report and Written Opinion issued in connection with corresponding Application No. PCT/US2014/042561 on Oct. 10, 2014.

*Primary Examiner* — Michael R Reid
*Assistant Examiner* — Christopher Ballman
(74) *Attorney, Agent, or Firm* — Paul Frank + Collins P.C.

(57) ABSTRACT

Embodiments of a force generating element that can broaden the application of valves and, in particular, pilot-operated valves to include applications that have extreme operating temperatures. These improvements forgo use of o-rings (and like elastomeric devices) in lieu of more durable and robust seals (e.g., metal-to-metal contact). Rather, as discussed more below, the valves incorporate a force generating element that ensures contact between components to form appropriate seals that allow the cylinder to maintain pressure, despite dimensional changes in the structure of the valve.

19 Claims, 7 Drawing Sheets

(56) References Cited

U.S. PATENT DOCUMENTS

| | | | |
|---|---|---|---|
| 2008/0017257 A1* | 1/2008 | Choate | F16K 17/04 |
| | | | 137/540 |
| 2009/0065727 A1* | 3/2009 | Nomichi et al. | 251/359 |
| 2010/0148108 A1* | 6/2010 | Glaun | 251/324 |
| 2010/0276620 A1* | 11/2010 | Ezekiel | F16K 5/204 |
| | | | 251/172 |
| 2011/0284092 A1* | 11/2011 | Spencer et al. | 137/14 |

\* cited by examiner

VALVE WITH FORCE GENERATING ELEMENT

BACKGROUND

The subject matter disclosed herein relates to fluid couplings and, in particular, to valves and valve technology.

Many valves use a cylinder, a piston, a disc, and a nozzle that work together to regulate flow of a working fluid. Pilot-operated valves also include a pilot assembly that can utilize the working fluid to generate force on the piston. This force can effect contact of the disc with the nozzle. Pilot-operated valves may further incorporate one or more o-rings that create a seal between the periphery of the piston and the inner wall of the cylinder. This seal allows the cylinder to pressurize to generate the downward force that moves the piston to position the disc in contact with the nozzle.

Depending on the application, pilot-operated valves may experience a wide range of operating conditions. For example, liquefied gas is often kept at temperatures of −320° F. On the other end of the temperature spectrum, pressurized steam can reach temperatures of 750° F. or greater. Unfortunately, the o-rings found in pilot-operated valves (and other types of valves) are often made of materials (e.g., elastomeric materials and/or plastic) that are not compatible with these extreme operating temperatures.

To avoid unnecessary breakdown of the o-rings, one solution is to condition the working fluid before the working fluid enters the cylinder. For example, the valve may incorporate a heat exchanger that can cool or heat the working fluid to appropriate temperatures before the working fluid enters the cylinder. Another solution is to design the valve to operate without the o-ring. These designs may utilize seals that form from metal-to-metal contact, e.g., between the piston and the cylinder. However, manufacturing tolerances and other mechanical changes in the valve can disrupt contact between components of the valve and, thus, render the seals and the valve ineffective.

BRIEF SUMMARY OF THE INVENTION

This disclosure describes improvements that can broaden the application of valves and, in particular, pilot-operated valves to include applications that have extreme operating temperatures. These improvements forgo use of o-rings (and like elastomeric devices) in lieu of more durable and robust seals (e.g., metal-to-metal contact). Rather, as discussed more below, the valves incorporate a force generating element that ensures contact between components to form appropriate seals that allow the cylinder to maintain pressure, despite dimensional changes in the structure of the valve.

BRIEF DESCRIPTION OF THE DRAWINGS

Reference is now made briefly to the accompanying figures, in which.

Where applicable like reference characters designate identical or corresponding components and units throughout the several views, which are not to scale unless otherwise indicated.

DETAILED DISCUSSION

Figure 1:
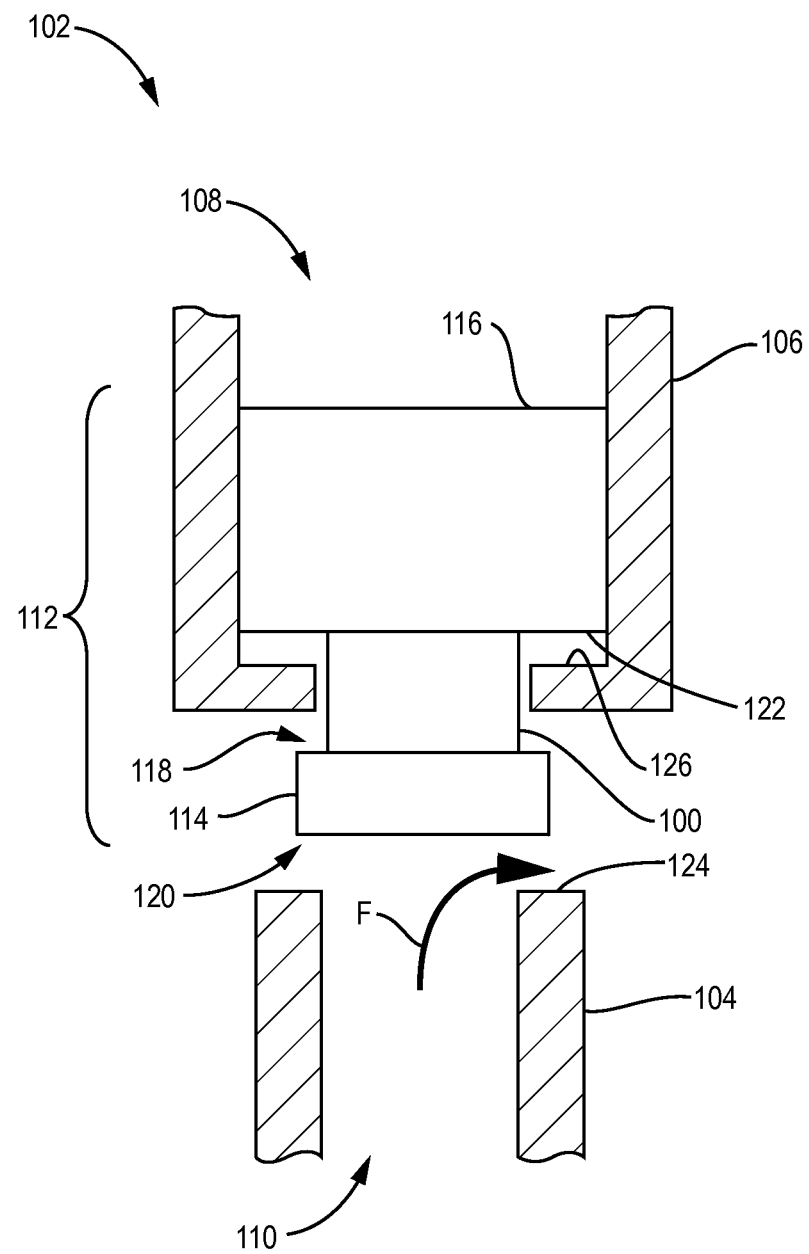
FIG. 1 depicts a schematic diagram of an exemplary embodiment of a force generating element as part of an example of a valve assembly having a disc element in a first position.
Figure 2:
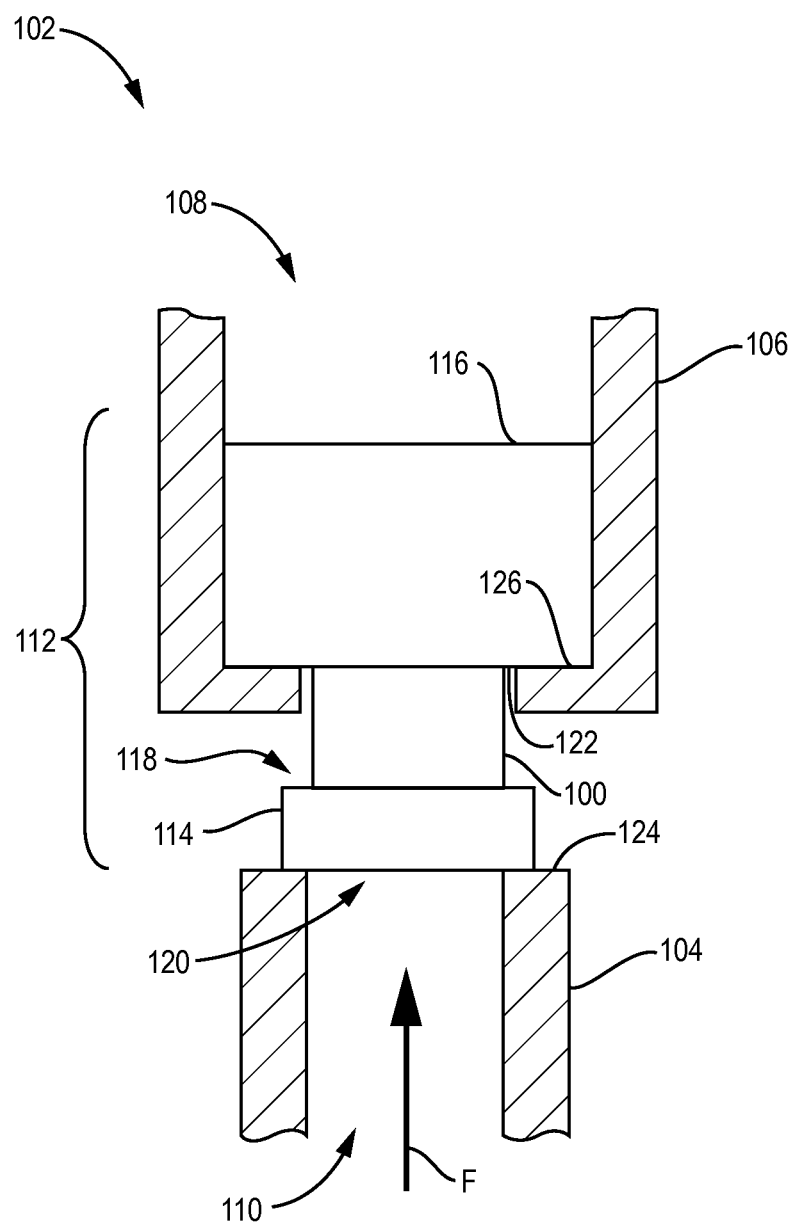
FIG. 2 depicts a schematic diagram of the valve assembly of FIG. 1 with the disc element in a second position.

FIGS. 1 and 2 depict schematic diagrams of a force generating element 100 for use in a valve assembly that operate at extreme temperatures. Examples of the valve assembly include pilot-operated valves that utilize line or system pressure of a working fluid to operate (i.e., to move components of the valve assembly). Use of the force generating element 100 allows these pilot-operated valves to operate without gaskets and seals (e.g., o-ring seals) that are often necessary to build sufficient pressure to effectuate movement of these components. In lieu of these seals and gaskets, the pilot-operated valve with the force generating element 100 utilizes metal-on-metal contacts to form seals that are compatible with working fluids at temperatures outside the upper and lower temperatures of conventional pilot-operated valves.

As shown in FIG. 1, the force generating element 100 is part of a valve assembly 102 that includes a nozzle 104 and a cylinder 106 that forms a piston chamber 108. The nozzle 104 has a flow path 110 for a working fluid F to enter and/or exit the valve assembly 102. The valve assembly 102 also includes a piston assembly 112 with a disc element 114 and a piston element 116 that travels in the piston chamber 108. The disc element 114 has a first side 118 and a second side 120. The piston assembly 112 may incorporate the force generating element 100 between the first side 118 of the disc element 114 and, in one example, a bottom side 122 of the piston element 116. As also shown in FIG. 1, components of the valve assembly 102 form one or more seating surfaces (e.g., a first seating surface 124 and a second seating surface 126) that are spaced apart from one another on different components (e.g., the nozzle 104 forms the first seating surface 124 and the cylinder 106 forms the second seating surface 126).

When subject to pressurized fluid, the piston element 116 translates in the piston chamber 108 to locate the disc element 114 among a plurality of positions. The disc element 114 can have a first position, which in FIG. 1 spaces the second side 120 of the disc element 114 apart from the first seating surface 124 and the bottom side 122 of the piston element 116 apart from the second seating surface 126. This configuration allows working fluid F to exit the nozzle 104. As best shown in FIG. 2, the disc element 114 can have a second position to prevent the flow of working fluid F from exiting the nozzle 104. In one example, the second position causes the second side 120 of the disc element 114 to contact the first seating surface 124 and the bottom side 122 of the piston element 116 contacts the second seating surface 126.

Examples of the force generating element 100 include devices that have a loading profile that defines the loading required to deflect the device, e.g., from a first deflected dimension to a second deflected dimension. Examples of this loading profile describe the load as substantially constant, e.g., from a first deflected dimension to a second deflected dimension. This feature of the force generating element 100 can accommodate for variations in the distance and/or spacing between the seating surfaces 124, 126 under constant pressure consistent with pilot-operated valves. Such variations may prevent appropriate contact in the second position. These variations can manifest from different sources, e.g., expansion and contraction due to changes in temperature of the working fluid, aging and wear of components of the valve assembly over time, maintenance procedures, as well as other events that may mechanically alter dimensional tolerances between the components of the valve assembly 102. In one example, tolerance stack-up in the valve assembly 102 can separate the seating surfaces 124, 126 to cause the disc element 114 to contact the first seating surface 124 before the piston element 116 contacts the second seating surface 126. The loading profile of the force generating element 100, however, allows the piston element 116 to continue to change position under constant pressure until the piston element 116 reaches, and contacts, the second sealing surface 126.

Figure 3:
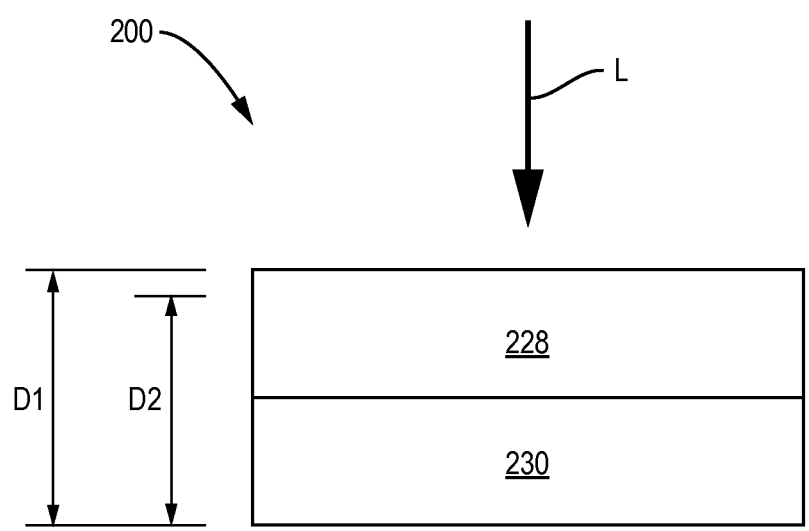
FIG. 3 depicts a schematic diagram of an exemplary embodiment of a force generating element that includes one or more resilient elements.

FIG. 3 illustrates a schematic view of an exemplary embodiment of a force generating element 200 with a loading profile that can accommodate for variations in a valve assembly. The force generating element 200 includes one or more resilient elements (e.g., a first resilient element 228 and a second resilient element 230). Examples of the resilient elements 228, 230 include springs and like deformable and/or flexible devices that can deflect under a load L. For example, as shown in FIG. 3, the force generating element 200 has a first deflected dimension (D1) and a second deflected dimension (D2) that is less than the first deflected dimension (D1). In one embodiment, the load L at the first deflected dimension (D1) is about the same as the load L at the second deflected dimension (D2). As noted above, this loading profile is useful to allow over travel and/or over driving of a piston (e.g., piston element 116 of FIGS. 1 and 2) with fluid under constant pressure.

Figure 4:
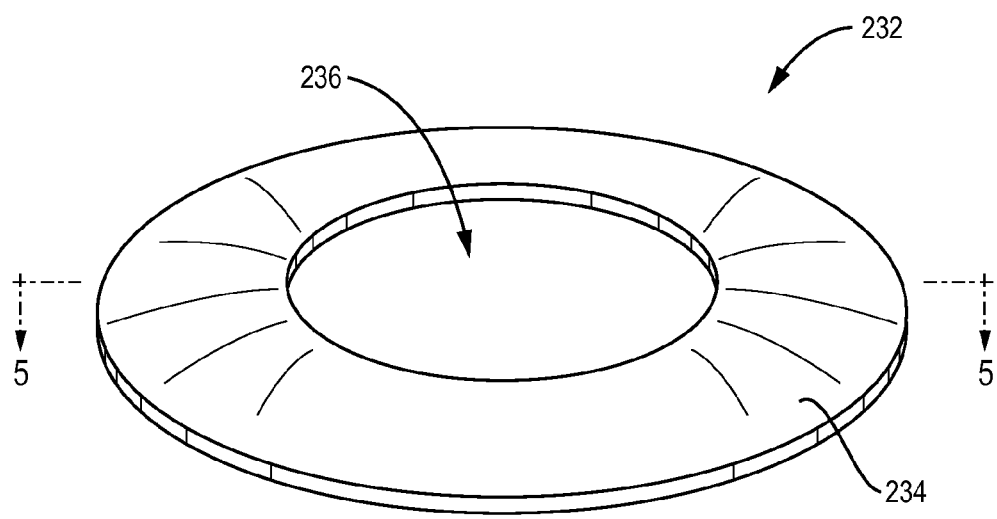
FIG. 4 depicts a perspective view of an example of a resilient element in the form of a spring washer.
Figure 5:
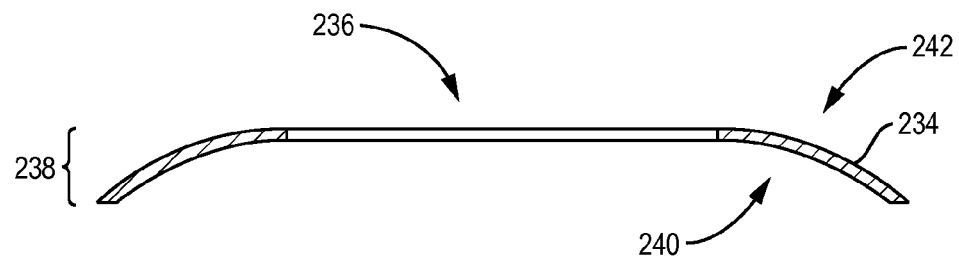
FIG. 5 depicts a side, cross-section view of the spring washer of FIG. 4.

FIGS. 4 and 5 illustrate an example of a spring washer 232 for use as a resilient element (e.g., resilient elements 228, 230 of FIG. 3). In the perspective view of FIG. 4, the spring washer 232 forms of an annular ring 234 with a central opening 236. FIG. 5 depicts a cross-section view of the spring washer 232 taken at line 5-5 of FIG. 4. The spring washer 232 has a frusto-conical shape 238 with a concave side 240 and a convex side 242. As illustrated in FIG. 5, the concave side 240 is useful to describe the side of the shape 238 with dimensions that cause the washer 234 to curve upwardly from the outer periphery of the washer 234 towards the central opening 236. Likewise, the convex side 242 describes the side of the shape 238 with dimensions that cause the washer 234 to curve downwardly from the central opening 236 toward the outer periphery of the washer 234. Examples of the spring washer 232 include Belleville washers, which deflects (e.g., from the first deflected dimension to the second deflected dimension) under a substantially constant force to effect deformation of the washer. In one example, the spring washers 232 may be selected according to their inside/outside diameters to provide the force generating element, e.g., with the appropriate size and loading profile, as desired.

Figure 6:
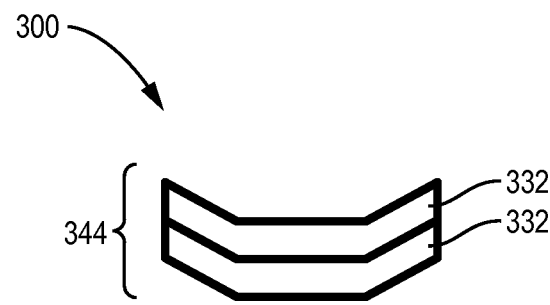
FIG. 6 depicts a side view of an exemplary embodiment of a force generating element having a pair of spring washers in a first stacked configuration.
Figure 7:
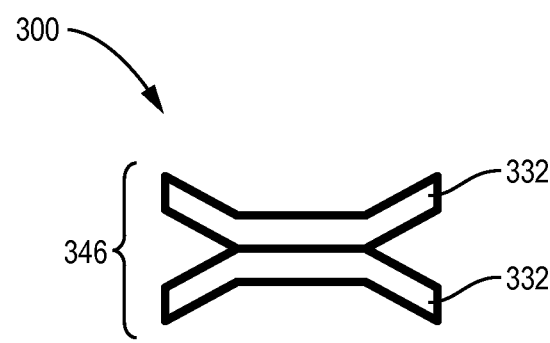
FIG. 7 depicts a side view of the force generating element of FIG. 6 with the spring washers in a second stacked configuration.
Figure 8:
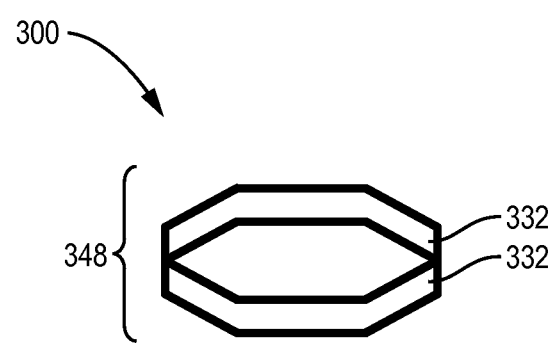
FIG. 8 depicts a side view of the force generating element of FIGS. 6 and 7 with the spring washers in a third stacked configuration.

FIGS. 6, 7, and 8 depict a side view of an exemplary embodiment of a force generating element 300. In the example of FIG. 6, the force generating element 300 arranges a plurality of spring washers 332 in a first stacked configuration 344. This configuration positions, or nests, adjacent spring washers 332. The nesting of the spring washers 332 positions the convex side (e.g., convex side 242 of FIG. 5) in the concave side (e.g., concave side 240 of FIG. 5). The example of FIG. 7 positions the spring washers 232 in a second stacked configuration 346. This configuration mates the convex side (e.g., convex side 242 of FIG. 5) of the adjacent spring washers 332. As best shown in FIG. 8, the spring washers 332 of the force generating element 300 can also assume a third stacked configuration 348 in which the concave side (e.g., concave side 240 of FIG. 5) of the adjacent spring washers 332 face one another. This configuration mates the peripheral surfaces on the annular ring (e.g., annular ring 234 of FIG. 4).

Implementation of one or more of the stacked configurations 344, 346, 348 can help tune the loading profile of the force generating element 300. For example, arranging spring washers 332 in one or more of the stacked configurations 344, 346, 348 can set the downward force required to deflect the force generating element 300, e.g., from D1 to D2 in FIG. 3. Variability in these configurations are useful, for example, to design the force generating element for valve assemblies that have working fluids at higher pressures and, thus, are capable of effecting greater downward force on the force generating element.

Figure 9:
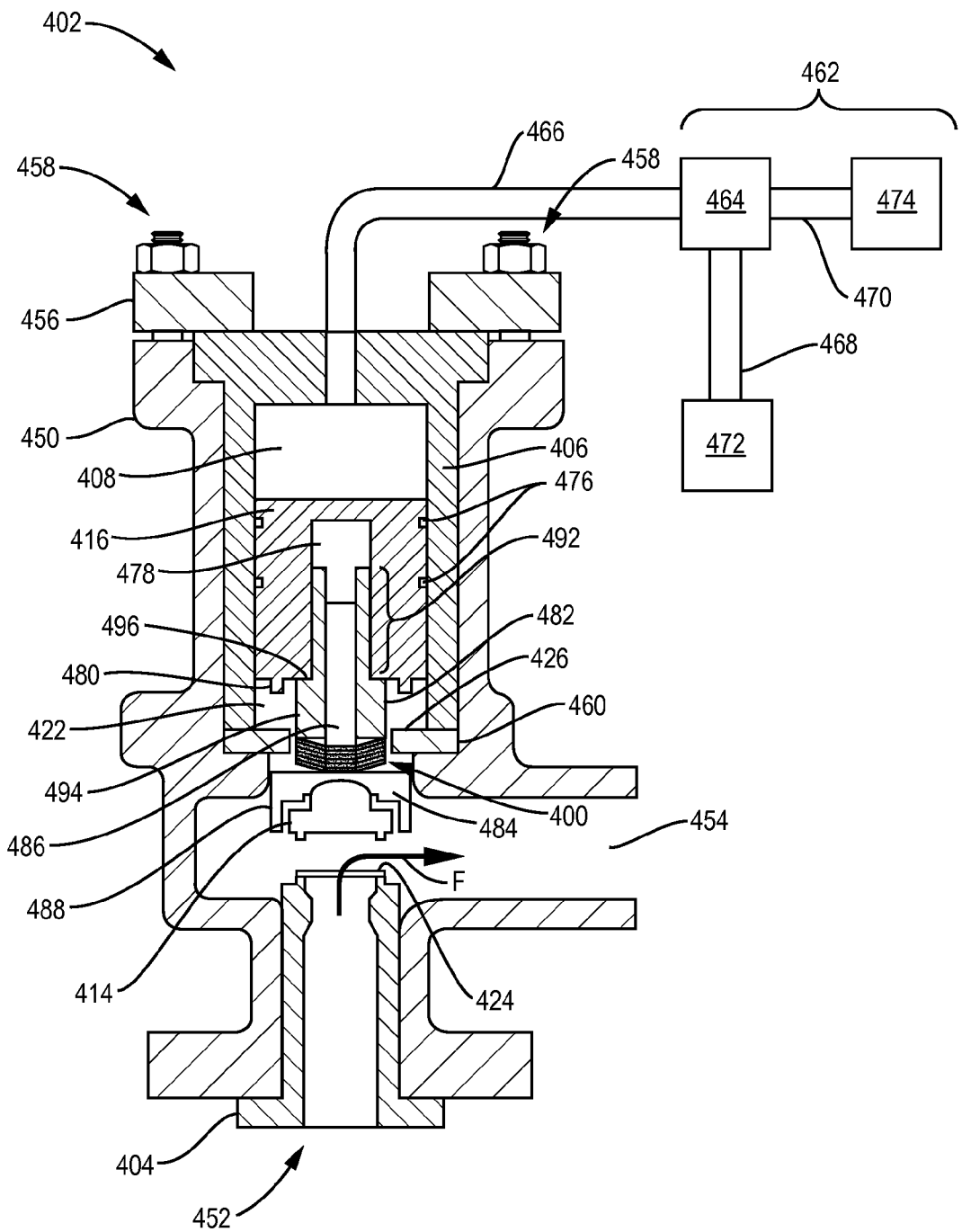
FIG. 9 depicts a side, cross-section view of an exemplary embodiment of a force generating element as part of an example of a valve assembly having a disc element in a first position.
Figure 10:
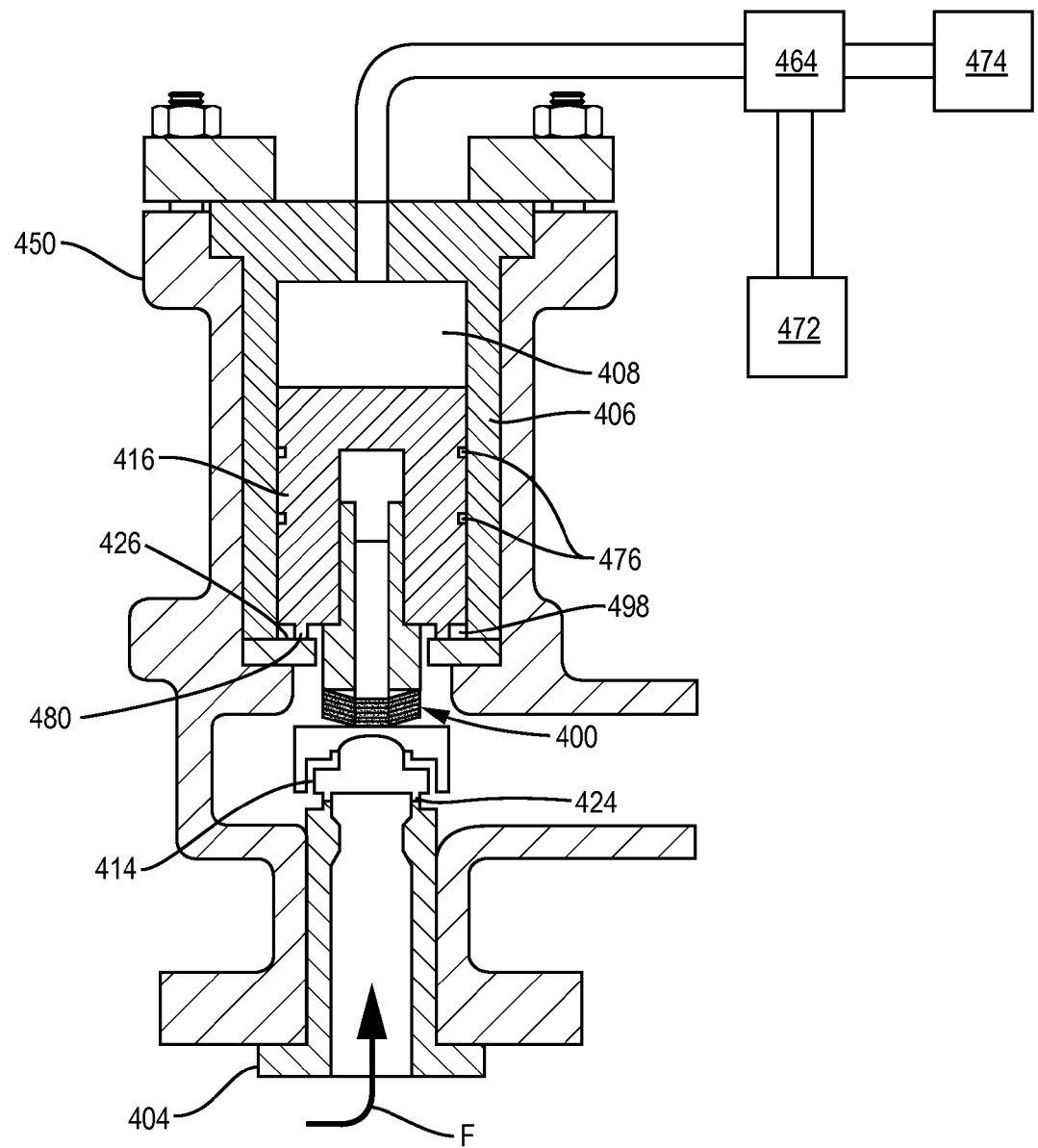
FIG. 10 depicts the side, cross-section view of the valve assembly of FIG. 9 with the disc element in a second position.

FIGS. 9 and 10 illustrate cross-section views of an exemplary embodiment of a force generating element 400 that accommodates for tolerance build-up between seating surfaces in a valve assembly. The parts and/or components discussed above may be useful as kit and/or compilation that can be used to update, modify, and/or refurbish the valve assembly. In FIG. 9, the valve assembly 402 has a housing 450 with one or more inlet/outlets (e.g., a first inlet/outlet 452 and a second inlet/outlet 454). A retainer plate 456 attaches to the housing 450 using one or more fasteners 458 (e.g., bolts, screws, etc.). In one example, the valve assembly 402 includes a seal plate 460 (which can be separate from the cylinder 406) to form the second seating surface 426. The valve assembly 402 also includes a pilot valve assembly 462 with a pilot valve 464 and one or more flow paths (e.g., a first flow path 466, a second flow path 468, and a third flow path 470). As shown in FIG. 9, the first flow path 466 can couple with the piston chamber 408. The second flow path 468 and the third flow path 470 can couple with one or more fluid sources (e.g., a first source 472 and a second source 474).

In the construction shown in FIG. 9, the periphery of the piston element 416 has one or more annular grooves 476. At the bottom side 422, the piston element 416 has a cavity 478 and a boss element 480 set radially inwardly from the periphery of the piston 416. The boss element 480 may form an annular feature that circumscribes the cavity 478. In one example, the piston assembly includes a plunger 482 and a disc holder 484 that couples the force generating element 400 and the disc element 414 with the piston element 416. The disc holder 484 can have a shaft element 486 and a disc retainer element 488, which couples with the disc element

414. Examples of the plunger 482 can have a stepped outer profile that defines a first section 492 and a second section 494 with dimensions that are larger than the first section 492. In one example, the dimensions of the second section 494 can form a seat area 496 that, when the first section 492 inserts into the cavity 478, mates and/or comes in contact with the piston element 416.

Operation of the pilot valve 464 pressurizes and depressurizes the cylinder 406 to cause the piston element 416 to translate in the piston chamber 408. In one example, the pilot valve 464 couples the cylinder 406 with the first source 472. Examples of the first source 472 can provide fluid at a pressure (also "system pressure") that is the same as the pressure of the working fluid F. The pressurized fluid generates force on the piston 416. Although the pressurized fluid is at the system pressure as the working fluid F (that acts on the disc element 414), the piston element 416 will translate in the piston chamber 408 because the surface area of the piston element 416) that is larger than the surface area of the disc element 414. The movement of the piston element 416 changes the position of the disc element 414, e.g., from the first position to a second position in which the disc element 414 seals the nozzle 404.

FIG. 10 shows the disc element 414 in this second position to prevent the flow of working fluid F through the nozzle 404. In the second position, the boss element 480 contacts the second seating surface 426 to create a void 498 between the inner surface of the cylinder 406, the second seating surface 426, and the boss element 480. When pressurized, tolerances and other construction deviations may allow fluid to flow between the inner surface of the cylinder 406 and the periphery of the piston 416. This fluid can fill the annular grooves 476 and the void 498. The pressurized fluid generates sufficient downward force on the piston 416, however, to create a contact seal between the second seating surface 426 and the boss element 480. This contact seal does not allow fluid, or any substantial amount of fluid, to escape from the void 498 into other areas of the housing 450.

As noted herein, operation of the valve assembly 402 often relies on appropriate seating of the disc element 414 and the boss element 480 with, respectively, the first seating surface 424 and the second seating surface 426. The force generating element 400 can mitigate issues that can change the distance between the seating surfaces 424, 426. These changes may cause the disc element 414 to contact the first seating surface 424 before the boss element 480 contacts the second seating surface 426. The features of the force generating element 400 discussed herein allow the pressurized fluid, under system pressure, to continue to drive the piston element 416 until the boss element 480 contacts the second seating surface 426 to form the contact seal.

In one implementation, operation of the pilot valve 464 can couple the cylinder 406 with the second source 474. Examples of the second source 474 can provide fluid at atmospheric pressure. Thus, coupling of the cylinder 406 through the pilot valve 464 can effectively relieve the system pressure to remove (and/or reduce) the downward force of the disc element 414 on the nozzle 404. Reduction in the downward force to levels at, and more typically below, the force of the working fluid F on the disc element 414 will cause the disc element 414 to move from the second position, e.g., to the first position shown in FIG. 9. This change in the position of the disc element 414 allows the working fluid to exit the nozzle 404 (as shown, for example, in FIG. 9).

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly, comprising:
    a housing;
    a nozzle and a cylinder disposed in the housing, each formed separately from one another and from the housing so as to insert into the housing and be spaced apart from one another in the housing;
    a disc element with a first side and a second side, one of which is configured to contact the nozzle in a first position;
    a piston that transits in the cylinder, the piston configured to couple with the disc element so that each of the piston and the disc element are moveable relative to the nozzle, the piston having a first side with a surface in position to contact a fluid in the cylinder, wherein the piston is configured to move the disc element to the first position in response to the fluid, and wherein the piston has a second side, opposite the first side, that is configured to form a metal-to-metal seal with the cylinder; and
    a force generating element disposed on the first side of the disc element,
    wherein the force generating element has a loading profile that defines a first load at a first deflected dimension and a second load at a second deflected dimension that is different from the first deflected dimension, and
    wherein the first load is substantially the same as the second load.

2. The valve assembly of claim 1, wherein the force generating element comprises one or more spring elements.

3. The valve assembly of claim 2, wherein the spring elements comprise at least one conical spring washer.

4. The valve assembly of claim 2, wherein the one or more spring comprises a conical spring washer.

5. The valve assembly of claim 4, wherein the spring comprises a Belleville washer.

6. The valve assembly of claim 1, further comprising:
    a plunger having a first section that is adapted to insert into the piston; and
    an annular ring disposed on the second side of the piston to form the metal-to-metal seal.

7. The valve assembly of claim 6, further comprising:
    a disc holder having a shaft, wherein the piston is configured with a cavity inside the annular ring that is adapted to receive the disc holder in the piston; and
    a disc retainer that is adapted to couple with the disc holder and the disc element.

8. A valve assembly, comprising:
a housing have a first inlet/outlet and a second inlet/outlet disposed at an angle relative to one another;
a nozzle disposed in the first inlet/outlet, the nozzle having a first seating surface;
a cylinder disposed in the housing and spaced apart from the nozzle, the cylinder having a second seating surface, wherein at least one of the nozzle and the cylinder is formed separately from the housing so as to insert into the housing;
a piston disposed in the cylinder, the piston having a surface in position to contact a fluid;
a disc element coupled to the piston; and
a force generating element coupled between the piston and the disc element, the force generating element having a loading profile under substantially constant loading that defines a first deflected dimension and a second deflected dimension that is less than the first deflected dimension,
wherein each of the piston and the disc element are moveable relative to the nozzle to move the disc element in response to the fluid so that the disc element and the piston contact the first seating surface and the second seating surface, respectively, at the second deflected dimension, and
wherein the piston is configured to form a metal-to-metal seal with the first seating surface.

9. The valve assembly of claim 8, wherein the force generating element comprises a spring.

10. The valve assembly of claim 8, wherein the force generating element comprises a first conical spring washer and a second conical spring washer, and wherein the first conical spring washer and the second conical spring washer have a convex side and a concave side.

11. The valve assembly of claim 10, wherein the convex side of the first conical spring washer is disposed in the concave side of the second conical spring washer.

12. The valve assembly of claim 10, wherein the convex side of the first conical spring washer faces the convex side of the second conical spring washer.

13. The valve assembly of claim 10, wherein the concave side of the first conical spring washer faces the concave side of the second conical spring washer.

14. The valve assembly of claim 8, wherein the piston has a peripheral surface proximate the cylinder and a boss element on a bottom side, wherein the boss element forms an annular ring that is set radially inwardly from the peripheral surface, and wherein the boss element contacts the second seating surface at the second deflected dimension.

15. The valve assembly of claim 14, further comprising a seal plate that forms the second seating surface.

16. The valve assembly of claim 14, further comprising:
a disc holder having a shaft, wherein the piston is configured with a cavity inside the annular ring that is adapted to receive the disc holder in the piston; and
a disc retainer that is adapted to couple with the disc holder and the disc element.

17. The valve assembly of claim 16, further comprising a plunger having a first section that is adapted to insert into the cavity of the piston and a bore that is adapted to receive the shaft of the disc holder.

18. The valve assembly of claim 8, further comprising a pilot valve coupled with the cylinder, wherein the pilot valve has a first operative state that configures the pilot valve to couple the cylinder with fluid at a first pressure from a first fluid source.

19. The valve assembly of claim 18, wherein the pilot valve is further configured to couple the cylinder with fluid at a second pressure from a second source, and wherein the second pressure is less than the first pressure.

* * * * *